United States Patent
Kuwahara

(10) Patent No.: US 8,269,990 B2
(45) Date of Patent: Sep. 18, 2012

(54) IMAGE READING, FORMING AND STORING APPARATUS, AND A METHOD OF USING THE SAME

(75) Inventor: Tomohiro Kuwahara, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 1205 days.

(21) Appl. No.: 12/078,566

(22) Filed: Apr. 1, 2008

(65) Prior Publication Data

US 2008/0246976 A1    Oct. 9, 2008

(30) Foreign Application Priority Data

Apr. 4, 2007   (JP) ................. 2007-097980

(51) Int. Cl.
- *G06F 15/00* (2006.01)
- *G06F 3/12* (2006.01)
- *G06K 1/00* (2006.01)

(52) U.S. Cl. ...................... 358/1.13; 358/1.14

(58) Field of Classification Search .................. None
See application file for complete search history.

(56) References Cited

U.S. PATENT DOCUMENTS

| 2005/0207629 A1 | 9/2005 | Toyoda |
| 2009/0225349 A1* | 9/2009 | Hirai ........................ 358/1.15 |

FOREIGN PATENT DOCUMENTS

| CN | 1671184 A | 9/2005 |
| JP | 2006-11754 | 1/2006 |
| JP | 2006-211205 | 8/2006 |

* cited by examiner

*Primary Examiner* — Douglas Tran
(74) *Attorney, Agent, or Firm* — Smith, Gambrell & Russell, LLP

(57) ABSTRACT

An image forming apparatus according to the present invention includes a storage part which, to save read image data, saves image data not subjected to image processing together with processing data for image processing to be performed by an image processing part at later image formation. Then, the image forming apparatus, at the time of printing out the image data, subjects the image data to image processing only once by using the processing data in accordance with setting.

15 Claims, 9 Drawing Sheets

IMAGE READING, FORMING AND STORING APPARATUS, AND A METHOD OF USING THE SAME

This application is based on Japanese Patent Application No. 2007-097980 filed on Apr. 4, 2007, the contents of which are hereby incorporated by reference.

BACKGROUND OF THE INVENTION

1. Field of the Invention

The present invention relates to an image forming apparatus and an image forming system for saving image data of an image of a read document and using the saved image data. The invention also relates to a method and a program for saving image data of a read document. The invention further relates to an image reading device and an image reading system for reading a document image to obtain image data.

2. Description of Related Art

Conventionally, an image forming apparatus, such as a composite machine, having copying and scanning functions reads a document (for example, letter, image, or photo). When provided with a storage device such as a hard disc, the image forming apparatus can save read image data. Moreover, serving as a device that reads a document to obtain image data is a scanner. Saving image data by using such devices permits repeatedly printing the image data, transmitting the image data to a PC connected to the network, and transmitting the image data by facsimile.

JP-A-No. 2006-211205 discloses an image forming apparatus that saves image data of a read document. More specifically, described therein is an image forming apparatus which is provided with a box saving function of storing into a storage part a letter read by a scanning part, a saved letter usage function, and a saved letter delete function, and which has, for each of letters saved in a box, storage means adapted to hold a management table storing management information and an input part for inputting a user ID.

Here, conventionally in a composite machine or the like, to save image data of a read document, in view of achieving direct outputting such as printing, image data has been saved after subjected to image processing. For example, when zoom processing such as enlargement or reduction processing is set upon image data reading, the image data has been saved after subjected to image processing for zoom processing. Moreover, for example, when density is set upon image data reading, the image data has been saved after image processing for density conversion was performed on the image data of a read document. Further, for the purpose of reducing the data volume of image data, image processing for compressing the image data of a document has been sometimes performed.

In such image data saving, no problem is involved in directly printing the image data. However, performing additional image processing on image data that has been saved after subjected to image processing results in image quality deterioration and loss of document reproducibility and faithfulness. That is, saving image data after subjecting it to image processing, as has been conventionally practiced, poses a problem of serious loss of image data reusability. Thus, even image forming apparatuses have been introduced which prohibit additional image processing from being performed on saved image data.

The invention described in JP-A-No. 2006-211205 does not present a solution for such a problem with the reusability of saved image data. Actually, for the image data saving, it is only described that image data is saved into a HDD (paragraphs [0012], [0018], etc. of JP-A-No. 2006-211205).

SUMMARY OF THE INVENTION

In view of the aforementioned problem concerned with conventional art, the present invention has been made, and it is an object of the invention to provide an image forming apparatus that provides high document reproducibility, remarkable faithfulness, and no image quality deterioration even when image processing is performed on saved image data at the time of, for example, printing. That is, an image forming apparatus with high reusability of saved image data is provided. It is another object of the invention to provide an image forming system, an image reading device, an image data saving system, an image data saving method, and an image data saving program with high reusability of saved image data.

To achieve the object described above, an image forming apparatus according to one aspect of the invention includes: an image reading part reading a document to generate image data; an image processing part performing image processing on the image data; an image forming part printing out an image based on the image data already subjected to the image processing performed by the image processing part; and a storage part, to save the image data read by the image reading part, saving the image data not subjected to image processing, together with processing data for the image processing to be performed by the image processing part at subsequent image formation.

Conventionally, since image data has been saved after subjected to image processing, performing image processing again at the time of outputting the image data results in performing image processing twice, which causes image quality deterioration and loss of document reproducibility and faithfulness. However, according to the invention, all image processing is performed only once by using processing data only at the time of printing out image data, which permits dramatic improvement in reusability, reproducibility, and faithfulness of saved image data.

Preferably, to print out the image data stored in the storage part, the image processing part performs image processing by using the processing data, and the image forming part performs image formation based on the image data already subjected to the image processing. The invention provides a printout with higher reproducibility and faithfulness at the time of printing saved image data than that provided by conventional art. Moreover, unlike the conventional art, there is no need of prohibiting image processing from being performed at the time of printing the saved image.

Preferably, the processing data is a magnification equalizing value as a value for correcting a size difference between a document and an output image arising from a characteristic of the image reading part and the image forming part when the image data is printed out in a size equal to a size of the document. Conventionally, image data has been saved after subjected to image processing of zooming for the magnification equalizing value. However, with the invention, even when zooming is set at the time of printing-out, image processing of zooming on image data is required only once, which permits dramatic improvements in the reusability, reproducibility, and faithfulness of the saved image data. In addition, even when the magnification equalizing value changes due to replacement of the image reading part or the like, the image data can be outputted in the same size as that of the document.

Preferably, a density calculation part calculating a density value of the image data based on density distribution of the partial or entire image data is provided, and the processing data is the density value calculated by the density calculation part. Conventionally, image data has been saved after subjected to image processing for density conversion. However, with the invention, even when density conversion is set at the time of printing, image processing for density conversion performed on image data is required only once, which permits dramatic improvements in the reusability, reproducibility, and faithfulness of the saved image data.

Preferably, the image forming apparatus includes an input part for operating the apparatus, and as a mode selected for reading the document by the image reading part, at least a character mode selected for reading as a character document or a photo mode selected for reading a document including a photo can be selected and inputted from the input part, and the processing data is mode selection data indicating which of the modes has been selected to perform the document reading. Conventionally, in accordance with a selected mode, image data has been saved after subjected to image processing by filtering. However, with the invention, even when mode selection change is set at the time of printing, image processing by filtering performed on the image data is required only once, which permits dramatic improvements in the reusability, reproducibility, and faithfulness of the saved image.

An image forming system according to a second aspect of the invention includes: at least one image forming apparatus including: an image reading part reading a document to generate image data, an image processing part performing image processing on the image data, an image forming part printing out an image based on the image data already subjected to the image processing performed by the image processing part, and a storage part, to save the image data read by the image reading part, saving the image data not subjected to image processing, together with processing data for the image processing to be performed by the image processing part later on; a network connecting the image forming apparatus; a storage device connected to the network and saving the image data of the read document and the processing data in a shared manner.

Conventionally, performing image processing, such as zooming, density conversion, character-photo mode conversion, etc. upon outputting shared image data has caused image quality deterioration. However, with this aspect, image data with high reusability and reproducibility can be shared. Moreover, even from any image forming apparatus connected to the network, image formation with high reusability and reproducibility can be formed.

An image data saving method according to a third aspect of the invention includes the steps of: reading a document to generate image data; generating processing data for image processing to be performed on the image data at later image formation; saving the image data into a storage part without subjecting the image data to image processing; and saving into the storage part the processing data in association with the corresponding image data.

Conventionally, since image data has been saved after subjected to image processing, performing image processing again upon outputting the image data results in performing image processing twice, which causes image quality deterioration and losses of document reproducibility and faithfulness. However, with this image data saving method, image data can be saved with high reusability, reproducibility, and faithfulness of the image data.

Preferably, the image data saving method, to print the image data stored in the storage part, performs image processing by an image processing part on the image data to be printed, based on the processing data, and image forming part performs image formation based on the image data already subjected to the image processing. This therefore can prevent image processing from being performed twice upon outputting the image data.

An image data saving program according to a fourth aspect of the invention causes an image forming apparatus or an image forming system having at least an image reading part, a storage part, an image forming part, and an image processing part to: read a document by the image reading part to generate image data; generate processing data for image processing to be performed on the image data later on; save the image data into the storage part without subjecting the image data to image processing; and save the processing data into the storage part in association with the corresponding image data.

Conventionally, since image data has been saved after subjected to image processing, performing image processing again upon outputting the image data results in performing image processing twice, which causes image quality deterioration and losses of document reproducibility and faithfulness. However, with this image data saving program, image data can be saved with high reusability, reproducibility, and faithfulness of the image data.

Preferably, the image data saving program, to print the image data stored in the storage part, causes the image processing part to perform image processing on the image data to be printed based on the processing data, and causes the image forming part to perform image formation based on the image data already subjected to the image processing. This therefore can prevent image processing from being performed twice upon outputting the image data.

An image reading device according to a fifth aspect of the invention includes: an image reading part reading a document to generate image data; and a storage part, to save the image data read by the image reading part, saving the image data not subjected to image processing together with processing data for image processing to be performed for printing the image data at later image formation. With this image reading device, image data can be saved with high reusability.

An image data saving system according to a sixth aspect of the invention includes: at least one image reading device including: an image reading part reading a document to generate image data and a storage part, to save the image data read by the image reading part, saving the image data not subjected to image processing together with processing data for image processing to be performed for printing the image data at later image formation; a network connecting each image reading device; and a storage device connected to the network and sharing and saving the image data of the read document. With this image data saving system, image data with high reusability and reproducibility can be shared.

DETAILED DESCRIPTION OF PREFERRED EMBODIMENTS (First Embodiment)

Hereinafter, the first embodiment of the present invention will be described, referring to FIGS. 1 to 4.

First, referring to FIG. 1, a brief description will be given concerning an electrophotographic, digital image forming apparatus according to a first embodiment of the invention. The image forming apparatus will be described, referring to, as an example, a single complex machine 1 combining together a copy function, a scanner function, a printer function, and a FAX function.

Figure 1:
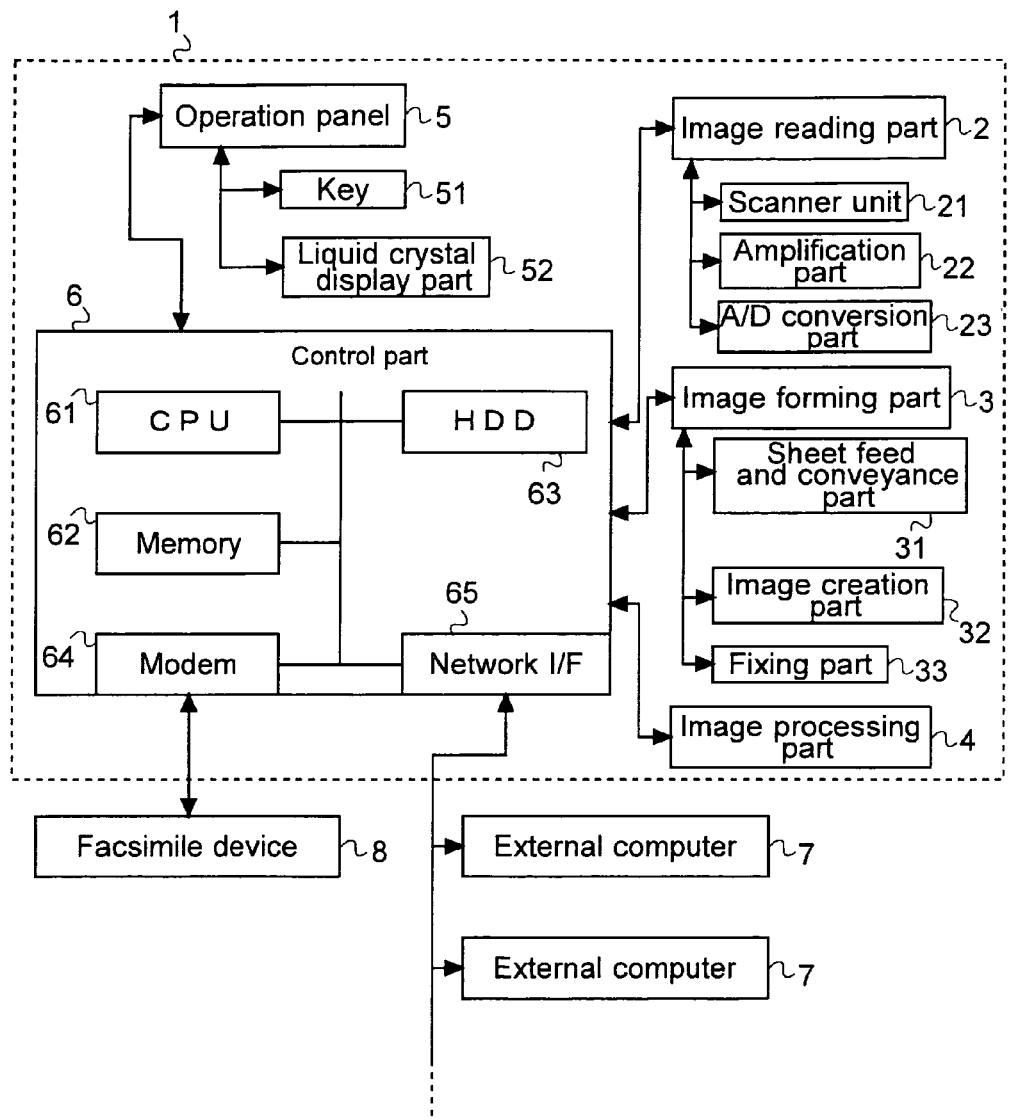
FIG. 1 is a block diagram showing one example of schematic configuration of a composite machine 1 according to a first embodiment of the present invention.

As shown in FIG. 1, the composite machine 1 according to this embodiment includes: an image reading part 2; an image forming part 3; an image processing part 4; an operation panel 5 (corresponding to an input part); and a control part 6 controlling these parts. Each of these parts will be described below.

The image reading part 2 is provided, for example, at the top of the main body of the composite machine 1, and reads a document image and converts the document image into an electrical signal to generate image data. The image reading part 2 is only required to generate image data. The image reading part 2 in the composite machine 1 of this embodiment is provided with a scanner unit 21 including therein: for example, optical system members such as an exposure lamp, a reflective plate, and a plurality of mirrors; a lens for focusing reflection light; an image sensor as a photoelectric conversion element composed of a CCD (Charge Coupled Device) or the like, etc.; and so on (which are all not shown).

The image reading part 2 has a contact glass on the top thereof. The optical system members are moved with respect to a document loaded on the contact glass, or the document on the contact glass is moved by an automatic document feeder or the like while the optical system members are fixed. In reading operation, the exposure lamp irradiates a document with light, reflection light thereof is led by the mirrors to the lens, which focuses the reflection light on the image sensor. In this manner, the document is converted into an analog electrical signal by the contact glass and the scanner unit 21.

Further, the image reading part 2 amplifies the analog electrical signal of the document to a predetermined magnitude by an amplification part 22. Thereafter, an analog/digital conversion part (A/D conversion part 23) performs quantization. This quantization generates digital image data of all pixels included in the document (digital signal). For example, for monochrome reading, quantization of 8 bits per pixel is done in accordance with the document image density. That is, density gradation of pixels includes 256 scales from 0 (00h) to 255 (FFh). On the other hand, for color reading, quantization of 8 bits each, i.e., 24 bits in total, is done for components R (Red), G (green), and B (Blue) of one pixel. In this manner, the document is read, and digital image data is generated by the image reading part 2. Quantization of 9 bits (512 scales) or 10 bits (1024 scales) may be performed.

The image forming part 3 prints out an image based on the image data read by the image reading part 2 and then subjected to image processing by the image processing part 4. There are various structures provided for this image formation, but the composite machine 1 of this embodiment has in the image forming part 3: a sheet feed and conveyance part 31, an image creation part 32, a fixing part 33, and so on.

The sheet feed and conveyance part 31 discharges a sheet fed from a cassette or the like loading sheets to the outside of the composite machine 1 via the image creation part 32 and the fixing part 33. Then, the sheet feed and conveyance part 31 includes: a plurality of pairs of conveyance rollers connected to, for example, a motor or a gear and driven into rotation; and a plurality of guides. With this structure, the sheet feed and conveyance part 31 feeds, guides, and conveys sheets inside the composite machine 1.

The image creation part 32 forms a toner image based on the image data, and transfers the toner image onto the sheet converted by the sheet feed and conveyance part 31. In this embodiment, an electrophotographic method can be adopted while including, for example, in the image creation part 32 a photosensitive drum, and a charger, an exposure device, a developing device, a transfer roller, and a cleaner disposed around the photosensitive drum.

The photosensitive drum is driven into rotation in a predetermined direction, and the charger charges the front surface of the photosensitive drum into a predetermined potential at a position opposing the photosensitive drum. The exposure device is composed of, for example, a laser scanning unit, an LED array, etc. The exposure device, based on image data obtained by subjecting, to image processing by the image processing part 4, image data read by the image reading part 2 or image data from an external computer 7 (see FIG. 1) connected by a network NT, irradiates light to the front surface of the photosensitive drum for scanning and exposure to thereby form an electrostatic latent image in accordance with the image data. The developing device charges a toner and feeds the toner to the electrostatic latent image formed on the photosensitive drum. As a result, the electrostatic latent image is developed as a toner image. Then, the transfer roller is brought into pressure contact with the photosensitive drum, thereby forming a nip. A voltage is applied to the transfer roller when a sheet passes through the nip. As a result, the toner image on the photosensitive drum is transferred onto the sheet conveyed. The cleaner, after transfer has been completed, cleans the toner remaining on the front surface of the photosensitive drum for the next toner image formation.

Then, to adapt the composite machine 1 to support full color, the image creation part 32 is required to form toner images of a plurality of toner colors (for example, black, yellow, cyan, and magenta) and superimpose the toner images of the different colors on one another. Moreover, in some cases, an intermediate transfer part, such as an intermediate transfer belt, for superimposing toner images of different colors on one another may be provided.

The fixing part 33 fixes the toner image transferred onto the sheet by applying heat and pressure thereto. The fixing part 33 of this embodiment is composed of, for example, a heat roller and a pressure roller. The heat roller and the pressure roller make pressure-contact with each other to form a nip. The heat roller has a heat generation source built therein. The sheet with the toner image transferred thereon enters into the nip between the heat roller and the pressure roller and then is heated and pressurized. As a result, the toner image is fixed on the sheet.

The image processing part 4, before image data transmission to the exposure device of the image forming part 3, performs various image processing, details of which will be described later.

The operation panel 5 (corresponding to an input part) includes: various input and set keys 51, such as ten keys and a start key. Moreover, the operation panel 5 includes: a liquid crystal display part 52 capable of displaying device operating condition and various messages and also permitting various settings to be made with a touch panel thereof; and so on. That is, the user performs operation and makes setting on the composite machine 1 through the operation panel 5. Then, what can be inputted and selected through the operation panel 5 are at least: as a mode selected for reading a document by the image reading part 2, a character mode selected for reading as a document with characters; and a photo mode selected for reading a document with a photo.

Then, as shown in FIG. 1, the control part 6 for controlling the various parts of the composite machine 1 is provided, on a control board provided in the composite machine 1. Specifically, the control part 6 is connected to the image reading part 2, the image forming part 3, the image processing part 4, the operation panel 5, etc. with signal lines, and controls operation and display of the entire composite machine 1. More specifically, the control part 6 of the composite machine 1 of this embodiment has: a CPU (Central Processing Unit) 61; a memory 62 composed of a ROM (Read Only Memory) and a RAM (Random Access Memory); an HDD (Hard disc drive) 63 (corresponding to a storage part); a modem 64; a network I/F 65; and so on.

The CPU 61 functions as a central processing unit, and controls the various parts of the composite machine 1 based on control programs and setting information stored in the ROM and the HDD 63. Since the composite machine 1 is multifunctional, a plurality of CPUs 61 may be provided so that the control function can be shared by these CPUs 61.

The memory 62 (ROM and RAM) and the HDD 63 are storage devices. The ROM stores control programs of the composite machine 1, and the CPU 61 reads the control programs from the ROM. The RAM is used for, for example, temporarily exploring the control programs or for temporarily exploring and saving image data. The HDD 63 is a high-capacity storage device and used for, for example, saving image data read by the image reading part 2 and saving the control programs and the setting information of the composite machine 1 provided by the user. In addition to the HDD 63 or instead thereof, a semiconductor storage medium such as a flash ROM may also be used.

Controlling operation of the various parts and causing the image reading part 2 and the image forming part 3 to operate by the control part 6 permits the composite machine 1 to, based on image data obtained by reading a document by the image reading part 2, perform image formation by the image forming part 3 to copy a document. Moreover, the composite machine 1 transmits the image data obtained by reading the document by the image reading part 2 to, for example, the HDD 63 (or the external computer 7), whereby the image data obtained by reading the document is saved, thus achieving a scanner function.

As shown in FIG. 1, the composite machine 1 according to this embodiment is connected to one or a plurality of external computers 7 via the network I/F 65. Therefore, the control part 6 can receive and print image data transmitted from the external computer(s) 7, and the composite machine 1 functions as a printer. Further, the composite machine 1 is also connected to an external facsimile device 8 via a public phone line network or the like. Therefore, the control part 6 can perform image data transmission and reception to and from the facsimile device 8, and the composite machine 1 has a facsimile function.

Next, referring to FIG. 2, the image processing part 4 of the composite machine 1 according to the first embodiment of the invention will be described.

First, the image processing part 4 of this embodiment include: a CPU for image processing, separately from that of the control part 6; a ROM storing control and image processing programs; a RAM for exploring image data subjected to image processing; an IC; and so on. The CPU 61 and the memory 62 in the control part 6 may perform image processing.

With these hardware configuration and image processing programs, functionally achieved in the image processing part 4 are: a zoom processing part 41; a filter processing part 42; a density conversion processing part 43; an output γ correction part 44; a halftone processing part 45; a data output part 46; and a density calculation part 47.

The zoom processing part 41 achieves a magnification variation function through digital processing. That is, the zoom processing part 41 performs processing of enlarging and reducing image data.

The filter processing part 42 performs edge enhancement processing, smoothing processing, etc. on a pixel included in image data. The filter processing part 42 performs the edge enhancement processing for performing character image formation and performs smoothing processing for performing photo image formation.

For example, the edge enhancement processing is achieved by forming a matrix where density gradation (for example, values 0 to 255 for monochromatic 256-gradation) included in each pixel of a certain region (with for example, 7×7 pixels or 9×9 pixels) with a focused pixel in the middle is assigned and then multiplying it with a matrix called a filter. Then, selected is a filter (differentiation filter) such that from the focused pixel subjected to integral multiplication, gradation values of the surrounding pixels multiplied by coefficients are subtracted. If a calculated value is such a large value that exceeds a predetermined threshold value, it can be judged that the focused pixel greatly differs in density from the surrounding pixels (that is, it is an edge portion), so that processing of increasing the density of the focused pixel is performed. Performing this processing on all the pixels of the image data permits performing image formation with a clear character outline.

On the other hand, the smoothing processing is achieved by forming a matrix where density gradation of pixels included in a certain region (for example, with 7×7 pixels or 9×9 pixels) with a focused pixel in the middle is assigned and multiplying this matrix by a matrix (integral filter) such that the focused pixel and the surrounding pixels are fractionally multiplied (adding all the fractions yields 1) and added together. As a result, by changing the density gradation of the focused pixel so as to reduce a density difference between the focused pixel and the surrounding pixels, a density change in the image can be made smooth, whereby a color image with beautiful gradation is formed.

Since one piece of image data may include a mixture of a character and a photo, the filter processing part 42 may perform processing of region separation between a character region and a photo region and then perform different filter processing on these different portions.

The density conversion processing part 43 performs processing of density conversion on each pixel of image data. Here, there are various techniques for the density conversion. Hereinafter, a description will be given, referring to a case where density conversion processing is performed by using a density value and a density conversion table in automatic density adjustment.

First, the density value is a value related to the density of image data calculated by, for example, the density calculation part 47 disposed in the image processing part 4 based on density distribution of partial or entire image data (for example, 32 gradation from 0 (light) to 31 (dark)). This density value is obtained from density distribution of pixels of the partial or entire image data, and serves as a value for automatically selecting an optimum density conversion table from among a plurality of density conversion tables. The density calculation part 47 may be achieved by the control part 6.

The density conversion table for automatic density adjustment is saved into a density conversion table memory 48, and is prepared in plural (for example, 32 kinds) in correspondence with the density value. Moreover, in each density conversion table, two threshold values are provided for pixel gradation values (for example, monochromatic 0 to 255 gradation). For pixels whose gradation value is smaller than the smaller gradation threshold value (hereinafter referred to as first threshold value), gradation values of the pixels after subjected to density conversion are reduced (for example, to 0 at a minimum). On the other hand, for pixels whose gradation value is larger than the larger gradation threshold value (hereinafter referred to as second threshold value), gradation values of the pixels after subjected to density conversion are increased (for example, to 255 at a maximum). Further, pixels having a gradation value between the first and second threshold values are linearly associated with the entire range (for example, 0 to 255).

More specifically, to provide darker density, a density conversion table is selected which has smaller first and second threshold values than those of the density conversion table currently selected, whereby gradation values of a larger number of pixels become larger. On the other hand, to provide lighter density, a density conversion table is selected which has larger first and second threshold values than those of the density conversion table currently selected, whereby gradation values of a larger number of pixels become smaller.

Automatically selecting a density conversion table in accordance with a density value and performing density conversion processing based on the density conversion table in this manner permits the user to obtain an image with density appropriately set without performing any special operation.

Not only the density conversion table may be provided for automatic density adjustment, but also a density conversion table set by the user may be stored in the density conversion table memory 48, or a density conversion table may be stored which binarizes image data to white and black for facsimile transmission or the like.

Specifically, the density conversion processing is processing of, upon image formation, changing a gradation value of each pixel included in original data and associating the density of each pixel of the original image data with density of each pixel of printed out image data.

The output $\gamma$ correction part 44 performs on image data processing of correcting a $\gamma$ characteristic possessed by the image forming part 3. That is, in an electrophotographic process, due to charge characteristics of the photosensitive drum, a toner, etc., it is hard to provide an image density output that changes linearly with respect to an input image. By correcting such a $\gamma$ characteristic, an image density output is provided which changes linearly with respect to an input image.

The halftone processing part 45 is provided for achieving so-called pseudo halftone processing such as dithering processing and error diffusion processing. That is, in image formation by a digital electrophotographic method, only binary dotting operation, i.e., dotting or not dotting, can be performed for printing, and thus it is required to express halftone in a pseudo manner depending on the size and density of a dot. Thus, the halftone processing part 45 performs pseudo halftone processing based on the gradation of each pixel. Then, the exposure device of the image creation part 32 of the image forming part 3, based on image data already subjected to the halftone processing, forms an electrostatic latent image.

The data output part 46 transmits image data already subjected to image processing to the exposure device of the image forming part 3, the external computer 7, and the modem 64 as appropriate. Upon this transmission, the data output part 46 transmits the image data already subjected to image processing after converting it into a data form that permits usage by the exposure device.

Then, the image processing part 4 is connected to the control part 6, the image reading part 2, and the HDD 63. In copying, the image processing part 4, in response to transmission of a control signal and data from the control part 6, receives image data of a document read by the image reading part 2 and performs image processing thereon. On the other hand, in printing image data scanned in the past and saved in the HDD 63, the image processing part 4 receives the image data from the HDD 63 and performs image processing thereon. These pieces of image data already subjected to image processing are printed when transmitted to the image forming part 3 (exposure device), and are transmitted to the facsimile device 8 when transmitted to the modem 64.

Next, referring to FIGS. 1 and 2, saving image data in the composite machine 1 according to the first embodiment of the invention will be described.

As described above, the composite machine 1 of this embodiment includes: the image reading part 2 reading a document to generate image data; the HDD 63 saving the image data read by the image reading part 2; the image forming part 3 printing out an image based on the image data; and the image processing part 4 performing image processing on the image data.

Then, the composite machine 1 of this embodiment, to save image data, saves into the HDD 63 image data not subjected to image processing together with data to be processed by the image processing part 4 at the time of subsequent image formation. As a data form in which image data, is saved, for example, a bitmap, JPEG (Joint Photograph Experts Group) with low compressibility, PNG (Portable Network Graphics), or the like can be adopted. Moreover, image data may be compressed, but lossless compression capable of reproducing original data is preferable to prevent image quality deterioration. In addition, considering a recent increase in the storage capacity in the HDD 63 or the like, the image data may be saved without being compressed.

Figure 2:
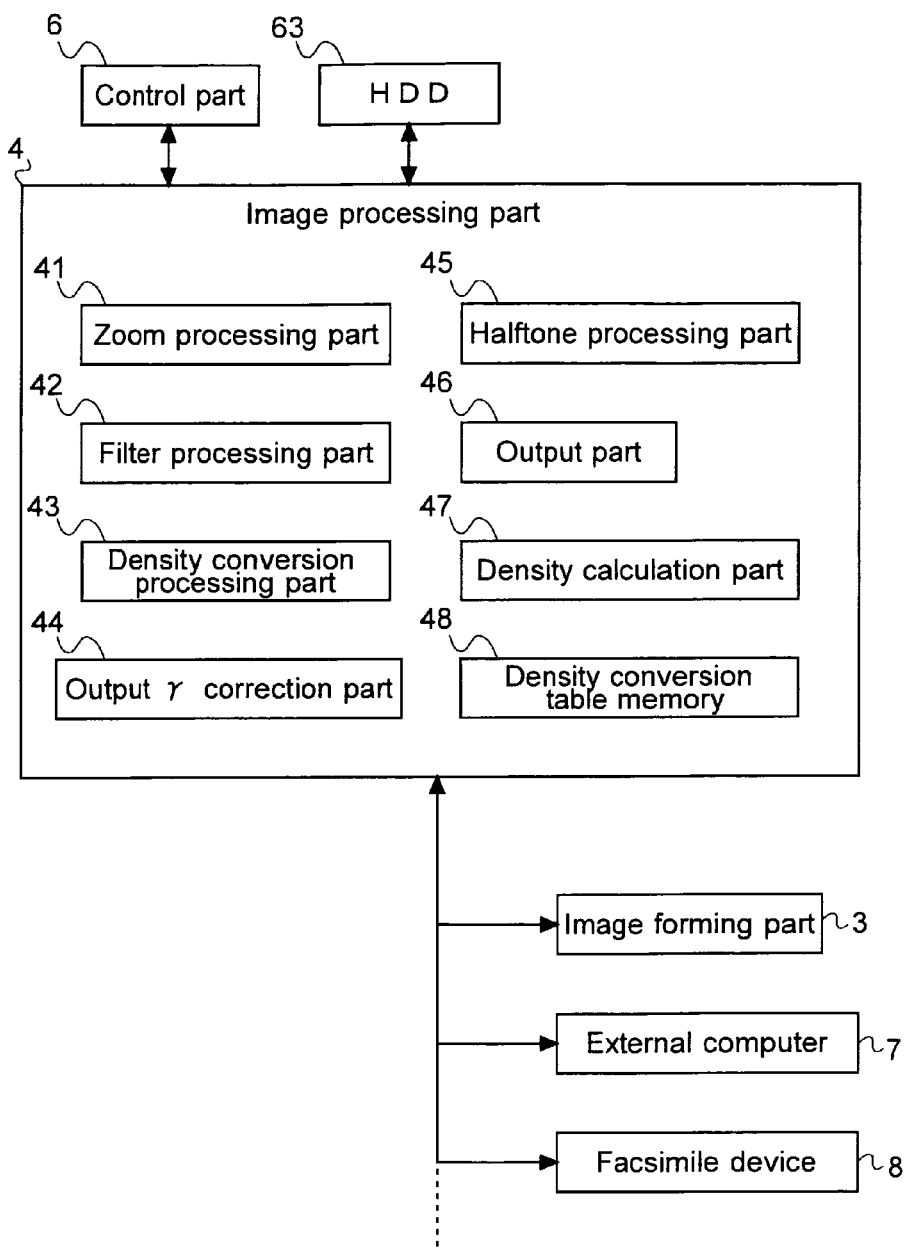
FIG. 2 is a functional block diagram explaining one example of functions played by an image processing part 4 of the composite machine 1 according to the first embodiment of the invention.

Here, the image processing includes: the aforementioned zoom processing, filter processing, density conversion processing, output $\gamma$ processing, halftone processing, compression processing, etc (see FIG. 2). Conventionally, read image data has been saved into the HDD 63 or the like after subjected to these image processing.

However, the composite machine 1 of this embodiment saves image data into the HDD 63 without subjecting it to these image processing. Then, the composite machine 1 also saves processing data which is required for image processing upon outputting the saved image data through image formation or the like by the image forming part 3.

Thus, detailed examples of the processing data include: a magnification equalizing value, a density value, mode selection data, etc.

First, the magnification equalizing value is a value for correcting a size difference between a document and image obtained by printing out image data which difference arises from properties possessed by the image reading part 2 and the image forming part 3. Document reading members, such as the optical system members, lens, and image sensor of the image reading part 2, are fitted with extremely high accuracy so as to achieve adequate reading, but it is difficult to fit them without any deviation, so that some error occurs. Moreover, an error also arises in the image forming part 3 due to fitting accuracy of the various members, properties of the exposure device, etc. For example, with this error, the size of an image copied at a setting of equal magnification (=100%) and the size of a document differ from each other by, for example, ±0.1 to 0.5%.

Moreover, the position of the document reading members such as the lens and the image sensor may be shifted during transportation and conveyance of the composite machine 1 or by impact, etc. in built environment. Also in this case, even when the document reading members are perfectly fitted at shipment from a factory, an error in reading by the image reading part 2 occurs.

Thus, to eliminate a difference between an actual document and an output image copied to bring the size of the document as closely as possible to the size of the image of the copy, the magnification equalizing value is set as a value specific to each image reading part 2. Then, using this magnification equalizing value, image processing with a digital zoom of, for example, approximately ±0.995 to 1.005 times is performed on the read image data to thereby clear up the difference. In one example of actual setting method, the magnification equalizing value can be easily calculated by first storing image data of a document for magnification equalizing value setting in the ROM and the HDD 63 of the control part 6, then actually causing the image reading part 2 to read the document for magnification equalizing value setting, and calculating a difference between the both with the CPU 61 or the like. Moreover, magnification equalizing values in both a main scanning direction and a sub-scanning direction can be calculated without use of any special measurement device such as a sensor. It is advised to save the magnification equalizing value in the memory 62, the HDD 63, and the like.

Conventionally, to resolve problems related to the magnification equalizing value, read image data is saved into the HDD 63 after subjected to image processing such as zoom processing for the magnification equalizing value or the like. However, when the user subsequently prints out this image data after setting image processing such as enlargement, reduction, or the like, image processing is performed on the image data twice. That is, the image data of the document is already rewritten at the first image processing, and thus further performing image processing results in poor faithfulness to the document, which leads to image quality deterioration. However, the composite machine 1 of this embodiment saves, together with processing data on the magnification equalizing value, image data of a document without subjecting it to any image processing, thus not leading to image quality deterioration. Therefore, the image data reusability can be improved.

Further, the magnification equalizing value to be used may vary at image processing in such cases as replacement due to malfunction of the image reading part 2 and the image forming part 3, impact caused during transportation, impact added in the set environment of the composite machine 1. For example, possible cases include a case where the magnification equalizing value was 0.2% before the replacement of the image reading part 2 but it turned to 0.4% after the replacement. However, the composite machine 1 of this embodiment also saves the magnification equalizing value together with the image data; thus, zoom processing can be performed based on the processing data on the magnification equalizing value upon actual printing out of the image data. Therefore, even a change in the magnification equalizing value can be handled.

Next, the density value will be described. In the composite machine 1 of this embodiment, density conversion of image data is performed by the density conversion processing part 43 of the image processing part 4. This density conversion processing part 43, upon automatic density adjustment as described above, performs density conversion based on a density conversion table corresponding to a density value calculated by the density calculation part 47.

For example, when the density calculation part 47 calculates 15 as a density value for a monochromatic image, a density conversion table to be selected is no. 15 (the density value is associated with the number of the density conversion table). Then, for example, to increase the density, a density conversion table numbered 16 or larger is selected. This shifts a gradation value of each pixel of the image data to a higher value. On the other hand, to decrease the density, a density conversion table numbered 14 or smaller is selected. This shifts a gradation value of each pixel of the image data to a lower value.

Here, image data of a read document has been conventionally saved after subjected to image processing such as density conversion based on these density value and density conversion table. That is, a pixel that is light (dark) in the document may be converted into a dark (light) pixel upon saving. Then, an attempt to change the density upon printing out such image data already subjected to image processing results in performing image processing for density change again. This therefore may lead to deterioration in the image quality and faithfulness to the document. It is also typically difficult to restore the image data already subjected to image processing to image data obtained at document reading.

However, in the composite machine 1 of this embodiment, a density value is saved as processing data without subjecting image data to image processing such as density conversion. Therefore, the image processing related to density conversion is performed only once at the time of outputting such as image data printing, which can prevent deterioration in the image quality and faithfulness. The invention is particularly effective in cases such as where image data is read at high density setting at the time of document reading and at low density setting at the time of printing-out.

Next, mode selection data will be described. In the composite machine 1 of this embodiment, as an apparatus performing operation and inputting on the composite machine 1, the operation panel 5 (see FIG. 1) is provided. On this operation panel 5, as a mode at the time of document reading, for example, selection can be made from among a character mode, a photo mode, an auto mode, etc.

For example, when the character mode is selected, to enhance the edge of a character by the filter processing part 42 described above to thereby provide a vivid image, filter processing for edge enhancement is performed. On the other hand, when the photo mode is selected, to output a photo image with beautiful gradation, filter processing for smoothing that makes a gradation change smooth is performed. In the auto mode, for example, the image processing part 4 recognizes whether image data of a document is a character image or a photo image, and performs filter processing for edge enhancement or smoothing. Further, when there is a mixture of a character image and a photo image, the image processing part 4 separates regions of these character and photo from each other, and performs different filter processing on them.

Here, image data of a document has been conventionally saved after subjected to filter processing such as edge enhancement or smoothing. That is, when filter processing such as edge enhancement is performed, and information on the density of each pixel is changed, and then, for example, a white (black) pixel on the document may be converted into a black (white) pixel when saved. Moreover, smoothing processing may change a scale value. It is typically difficult to bring image data subjected to image processing back to image data obtained at the time of document reading. For example, when the user performs image reading in a character mode but perform printing-out of the image in a photo mode, further image processing by filtering is performed, resulting in deterioration in the image quality and faithfulness to the document.

However, in the composite machine 1 of this embodiment, without subjecting read image data to image processing such as filter processing, mode selection information is saved as processing data, and thus image processing such as filter processing in the selected mode is performed only once at the time of printing out image data. Further, even when an image is printed out after the mode is changed, just different filter processing is performed. That is, change to the character mode, the photo mode, or the auto mode can be freely made without causing deterioration in the image quality and the faithfulness.

Figure 3:
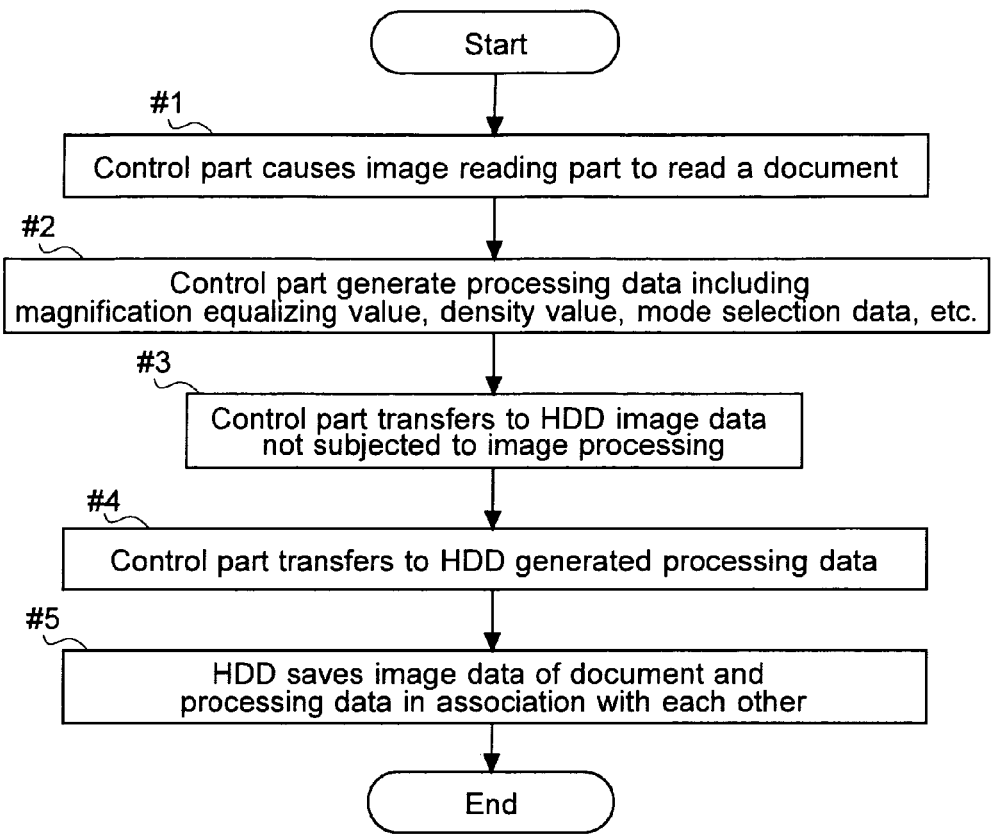
FIG. 3 is a flowchart explaining operation performed at the time of saving read image data by the composite machine 1 according to the first embodiment of the invention.

Next, referring to FIG. 3, a description will be given concerning operation performed at the time of saving image data of a read document in the composite machine 1 according to the first embodiment of the invention.

First, "start" indicates a point in time when instructions for document reading have been provided to the image reading part 2 of the composite machine 1. In response thereto, the control part 6 causes the image reading part 2 to read the document (step #1). Next, the control part 6, from image data of the read document, generates processing data related to data on set magnification equalizing value, a density value provided by the density calculation part 47, and mode selection data (character mode, photo mode, or the like), etc (step #2).

Next, the control part 6 transfers the image data read by the image reading part 2 to the HDD 63 without subjecting it to image processing (step #3). In addition, the control part 6 transfers the generated processing data together with the image data to the HDD 63 (step #4). Then, the control part 6 causes the HDD 63 to save the image data of the read document and the processing data in association with each other (step #5).

Next, referring to FIG. 4, a description will be given concerning operation performed at the time of printing out saved image data in the composite machine 1 according to the first embodiment of the invention.

Figure 4:
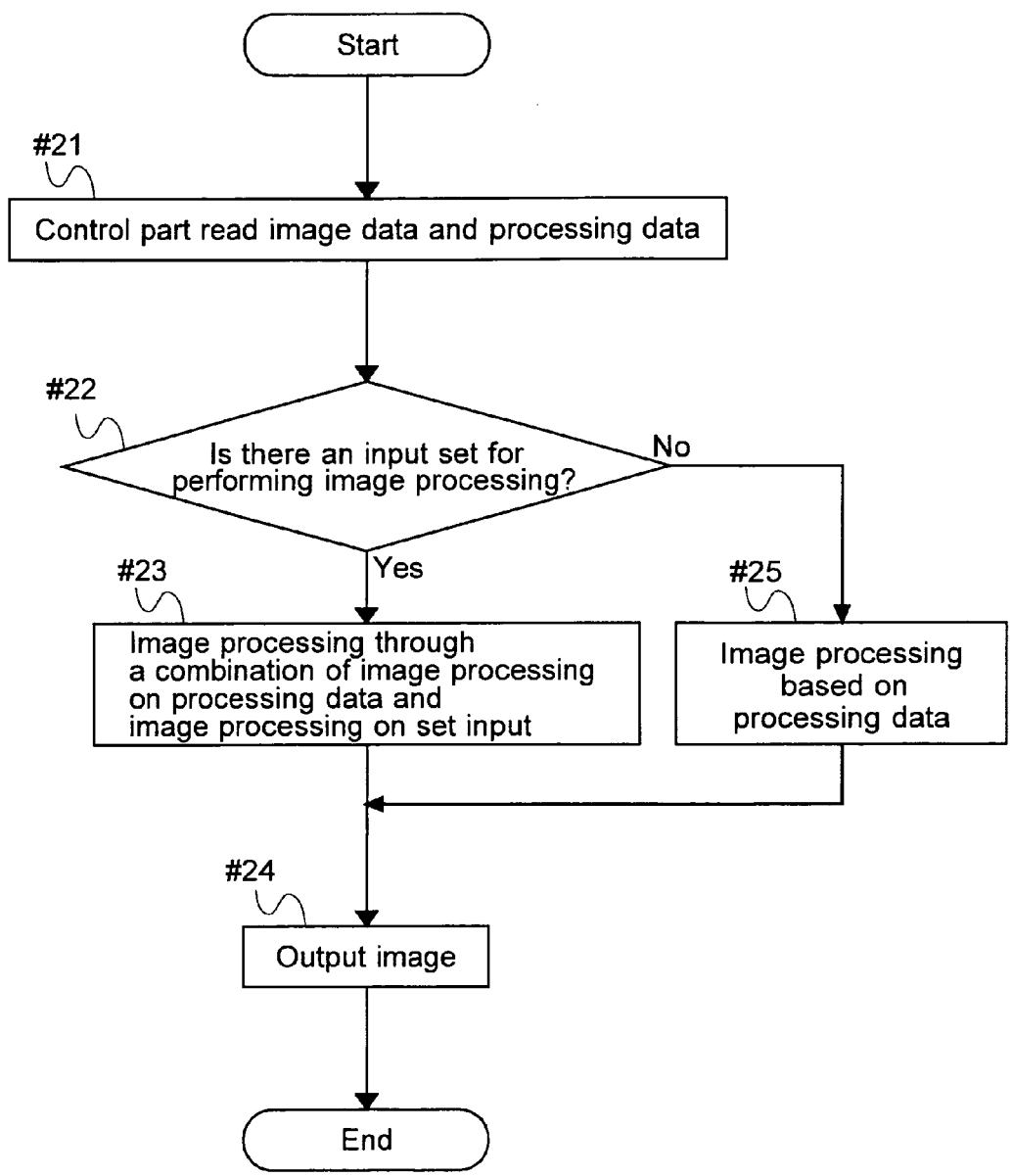
FIG. 4 is a flowchart explaining operation performed at the time of outputting saved image data by the composite machine 1 according to the first embodiment of the invention.

First, "start" in FIG. 4 indicates a point in time when the user has performed, on the composite machine 1 through the operation panel 5 or the external computer 7, input operation for printing out the image data saved in the HDD 63 inside the composite machine 1. Upon the input operation made by the user for the purpose of performing image formation on a sheet and outputting it, the control part 6 reads out target image data and processing data from the HDD 63 to the RAM or the like inside the control part 6 (step #21).

Next, the control part 6 checks whether or not, in setting made at the time of outputting the image data, any of image processing such as enlarging and reducing zoom processing, density conversion processing, mode change, and the like has been set through the operation panel 5 or the external computer 7 (step "22).

If any processing has been set, (Yes in step #22), the control part 6 controls the image processing part 4, which then performs image processing by combining image processing on the processing data and image processing set and inputted by the user this time (step #23). For example, if the user has made setting for reducing and outputting the image data at the time of printing it out, it is only required for the zoom processing part 41 to perform zoom processing based on a value obtained through multiplication of the magnification equalizing value and reduction ratio without performing zoom processing for the magnification equalizing value and reduction twice (the same applies to a case where enlargement is performed).

The same applies to the density conversion processing. For example, upon document reading, to lighten, at the time of printing-out, the density of image data that has been saved with its image density set high (the same in the opposite case), a selected density conversion table is changed. Then, based on the density conversion table changed, the density conversion processing part 43 is only required to perform density conversion processing on the saved image data. That is, the density conversion processing is required only once. Similarly, for the mode selection, saved image data is not subjected to image processing, and thus, when outputted, it is subjected to image processing by the filter processing part 42 or the like in a mode desired by the user.

Thereafter, based on the image data already subjected to the image processing, through exposure operation performed by the exposure device, an electrostatic latent image and then a toner image are formed, and a final image is printed out (step #24).

In short, the invention permits the user to perform image processing as desired without causing deterioration in the image quality and faithfulness, and enhances user convenience. Further, the invention does not require any special configuration to be realized, thus bringing cost advantages.

On the other hand, if any image processing has not been set in the setting at the time of outputting image data (No in step #22), the image processing part 4 performs image processing based on processing data including the magnification equalizing value, density value, mode selection data, etc. (step #25), and thereafter an image is formed (step #24).

This example refers to a case where saved image data is printed out by the image forming part 3. However, the same can be performed in a case where saved image data is outputted through facsimile transmission and a case where image data is filed as an electronic document or the like in the external computer 7 before outputted. That is, image processing is performed upon outputting through facsimile transmission or outputting through filing.

(Second Embodiment)

Figure 5:
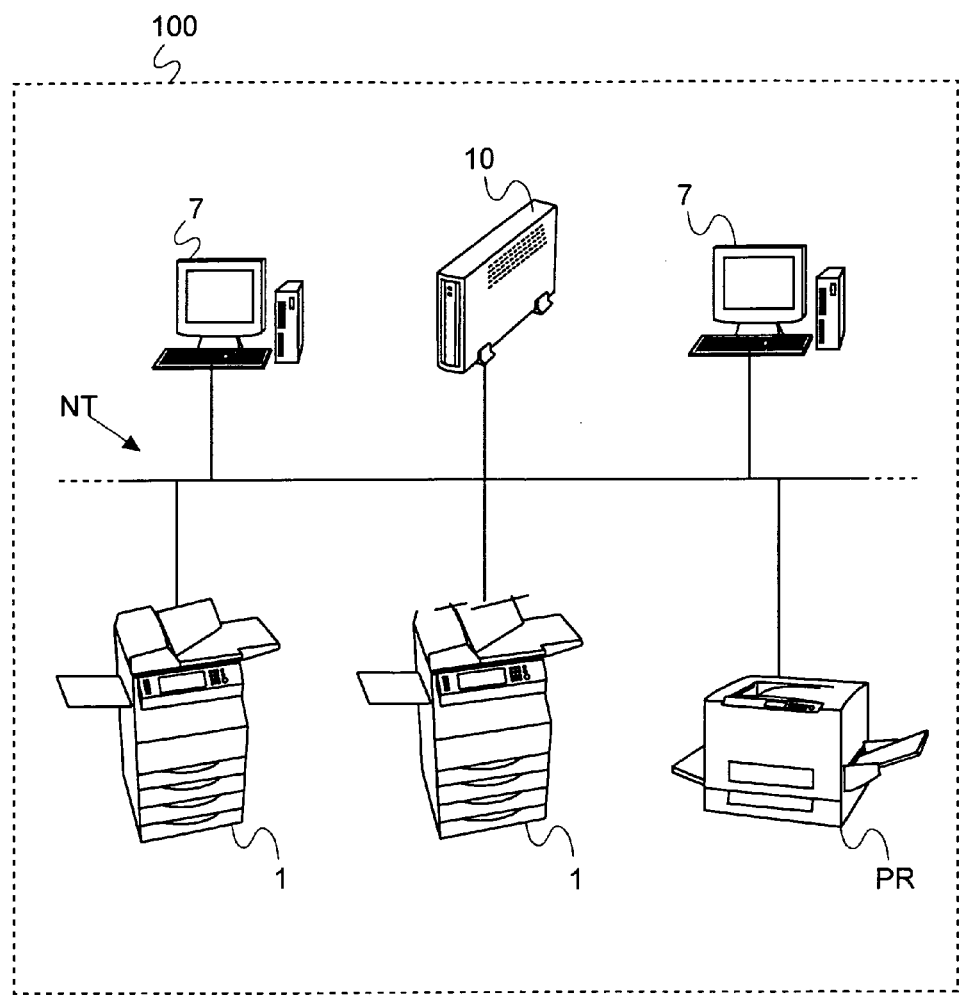
FIG. 5 is a connection diagram showing one example of connection of an image forming system according to a second embodiment of the invention.

Next, the second embodiment of the invention will be described, with reference to FIG. 5.

In this embodiment, a network NT is formed by using the composite machine 1 described in the first embodiment, etc.

The configuration of the composite machine 1 itself is the same as that in the first embodiment. For example, as shown in FIG. 5, to the network NT, two sets of the composite machine 1 described in the first embodiment are connected. In addition, one printer PR is connected. Moreover, two PCs as external computers 7 are connected. Further, a storage 10 (corresponding to a storage device) is connected to the network NT so that image data of a read document and processing data can be saved in a shared manner and outputted by each of the image forming apparatuses (composite machine 1, printer PR). In this manner, an image forming system 100 is constructed. Needless to say, the number of devices connected together is not limited to this.

Here, also in the image forming system 100 of this embodiment, the image data of the document read by the composite machine 1 is saved together with the processing data without being subjected to image processing. Therefore, the reusability of the saved image data is high. Thus, printing with favorable image quality and high reproducibility can be achieved even when printing-out is performed with a different composite machine 1 and printer PR. In other words, the image data with high reusability can be shared among the entire network NT.

Therefore, for example, reading by the composite machine 1 image data of a document, such as an internal document or a document model form, that needs to be shared, and storing this image data together with processing data into the storage 10 permits printing to be performed with favorable image quality and high reproducibility even from the composite machine 1 and the printer PR. Even when the volume of image data accumulated in the composite machine 1 has become small, this volume problem can be solved by saving the image data together with the processing data into the storage 10.

Needless to say, it is also permitted to store the image data of a document read by the composite machine 1 together with processing data into the HDD 63 of each composite machine 1 or the HDD of the PC, instead of the storage 10. Since the various devices are connected to the network NT, the image data can be shared even when the image data and the processing data are saved in the HDD 63 of the composite machine 1 or the HDD of the PC. Moreover, after the image data and the processing data are saved into the storage 10, the image data can be automatically erased from the HDD 63 of each composite machine 1 or the HDD of the PC.

[Third Embodiment]

Figure 6:
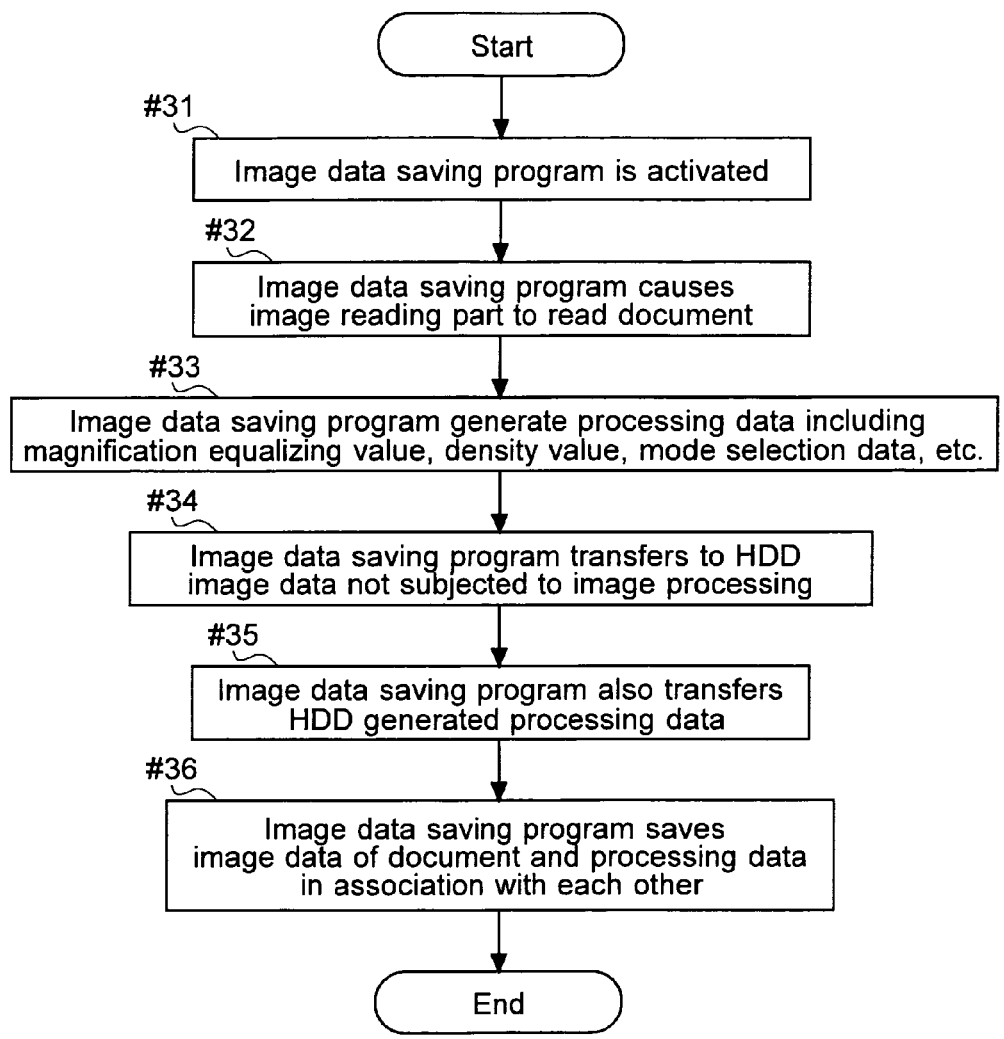
FIG. 6 is a flowchart explaining operation performed at the time of saving image data by an image data saving method and an image data saving program according to a third embodiment of the invention.

Next, the third embodiment of the invention will be described, referring to FIGS. 6 and 7.

As described above, in the invention, image data of a document read is saved together with processing data without subjected to image processing. Then, the saved image data is subjected to image processing only once when printed out. Therefore, the invention can be considered to be an image forming apparatus such as the composite machine 1 having the image reading part 2, the image forming part 3, etc., an image data saving method in the image forming system 100 having this image forming apparatus, or an image data saving program. Thus, the third embodiment will be described, from viewpoints of a method and a program.

First, referring to FIG. 6, image data saving according to the third embodiment of the invention will be described.

First, "start" indicates a point in time when instructions for document reading have been provided by the image reading part 2 of the composite machine 1. In response thereto, in the control part 6 of the composite machine 1, an image data saving program is read from the memory 62 or the HDD 63 and activated (step #31). Next, the image data saving program causes the image reading part 2 to read image data of the document to generate image data (step #32). Next, the image data saving program, from the image data of the read document, causes generation of processing data related to magnification equalizing value data, a density value, and mode selection data, etc. for image processing to be performed at subsequent image formation (step #33).

Next, the image data saving program transfers the image data read by the image reading part 2 to the HDD 63 without subjecting it to image processing (step #34). In addition, the image data saving program also transfers the generated processing data together with the image data to the HDD 63 (step #35). Then, the image data saving program saves into the HDD 63 the image data of the document read to the HDD 63 and the processing data in association with each other (step #36).

Next, referring to FIG. 7, a description will be given concerning printing-out of saved image according to this embodiment.

Figure 7:
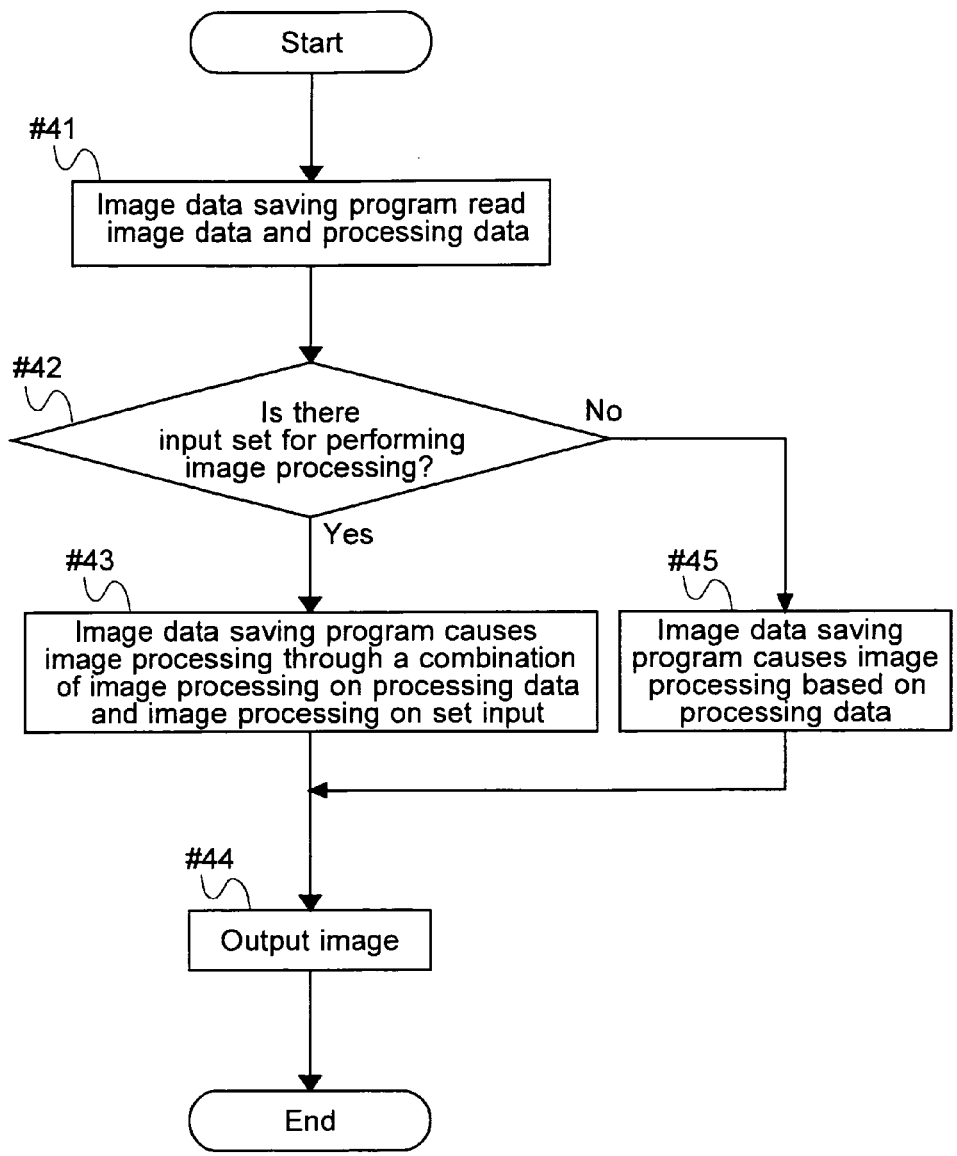
FIG. 7 is a flowchart explaining operation performed at the time of outputting saved image data by the image data saving method and the image data saving program according to the third embodiment of the invention.

First, "start" in FIG. 7 indicates a point in time when the user has performed, on the composite machine 1 through the operation panel 5 or the external computer 7, input operation for printing out image data saved in the HDD 63 or the storage 10 inside the composite machine 1.

Upon the input operation made by the user for the purpose of performing image formation on a sheet and outputting it, the image data saving program causes target image data and processing data to be read from the HDD 63 or the storage 10 to the RAM or the like in the control part 6 (step #41).

Next, the image saving program checks whether or not, in setting made at the time of outputting the image data, any of image processing such as enlarging and reducing zoom processing, density conversion processing, mode change, etc. has been set through the operation panel 5 or the external computer 7 (step "42).

If any image processing has been set, (Yes in step #42), the image data saving program controls the image processing part 4, which then performs image processing by combining image processing on the processing data and the image processing set and inputted by the user this time (step #43). For example, the image data saving program causes zoom processing to be performed based on a value obtained through multiplication of the magnification equalizing value and reduction ratio without performing zoom processing for the magnification equalizing value and reduction twice. Moreover, when setting for lightening the density at the time of printing-out has been made, the image data saving program changes the selected density conversion table. The same applies to mode selection. The image data saving program causes the filter processing part 42 or the like to perform image processing in a mode desired by the user at the time of outputting.

Thereafter, the image data saving program transmits the image data already subjected to image processing to the exposure device, causing it to perform exposure and also causing the image forming part 3 to print out an image (Step #44). In short, the image data saving method and program of the invention permit the user to perform image processing as desired with extremely high user usability without causing deterioration in the image quality and faithfulness.

On the other hand, if any image processing has not been set in the setting made at the time of outputting the image data (No in step #42), the image data saving program, based on the processing data including the magnification equalizing value, density value, mode selection data, etc., causes image processing to be performed (step #45). Thereafter, it causes the image forming part 3 to perform image processing (step #44).

[Fourth Embodiment]

Figure 8:
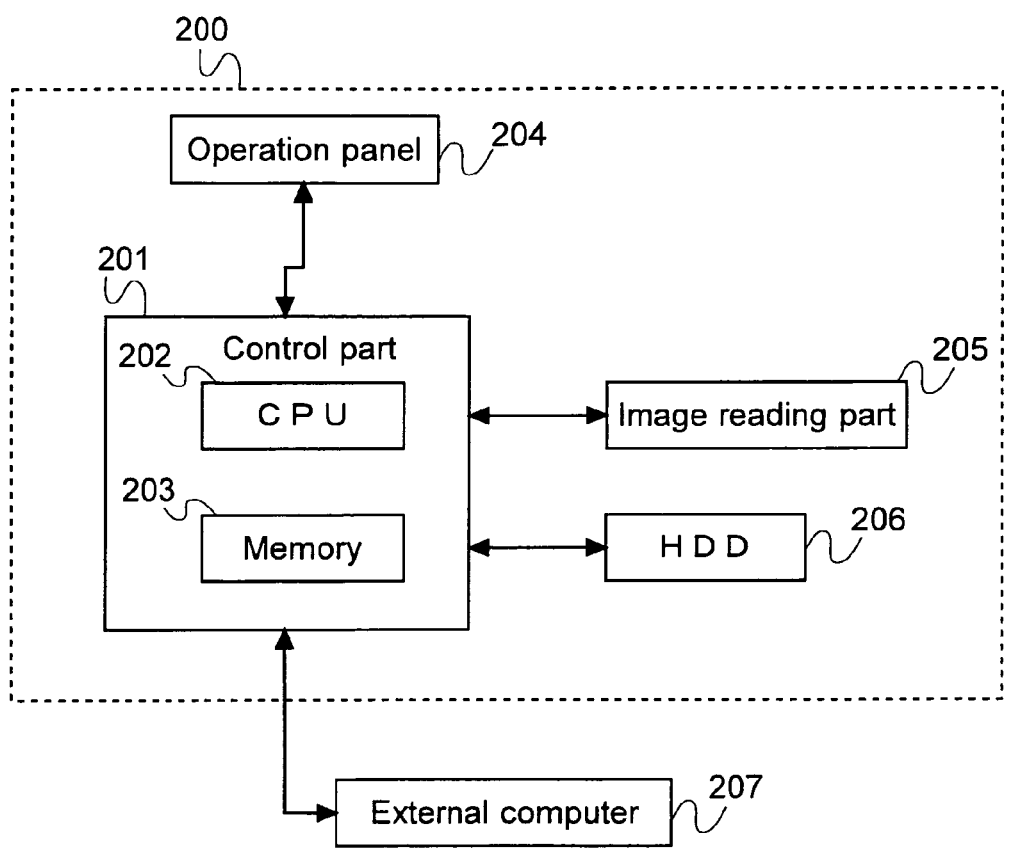
FIG. 8 is a block diagram showing one example of hardware configuration of an image reading device according to a fourth embodiment of the invention.

Next, the fourth embodiment of the invention will be described with reference to FIG. 8.

An image reading device 200 of this embodiment is a so-called scanner, and has the same structure as those of an image reading part 2 and part of the control part 6 of the composite machine 1 in the first embodiment. That is, the image reading device 200 reads a document and saves image data. In other words, the image reading device 200 is the one having the scanner function extracted from the composite machine 1 shown in the first embodiment.

The image reading device 200 of this embodiment has a control part 201 for controlling the entire device. Loaded in the control part 201 are a CPU 202 and a memory 203 composed of a ROM, a RAM, etc. Then, in some cases, the image reading device 200 is provided with an operation panel 204 for setting and inputting.

The image reading device 200 has the image reading part 205 that reads a document to generate image data. As the image reading part 205, the one similar to that shown in the first embodiment may be used, or for example, an image reading part 205 using a CIS (Contact Image Sensor) may be provided.

In addition, to save image data actually read and processing data, the image reading device 200 is externally (or internally) connected with an HDD 206 (corresponding to a storage part) or an external computer 207. The external computer 207 may be used as a terminal for performing operation and inputting on the image reading device 200.

Then, as is the case with the composite machine 1 described above, to save image data read by the image reading device 200, the image data is, without being subjected to image processing, saved into the HDD 206 or the like together with processing data indicating image processing to be performed at subsequent printing-out. This permits the image data to be saved in a manner with improved reusability. The processing data corresponds to data on a magnification equalizing value, a density value, a selected mode. etc. Processing required for generating the processing data can be performed in the CPU 202, the memory 203, etc.

[Fifth Embodiment]

Figure 9:
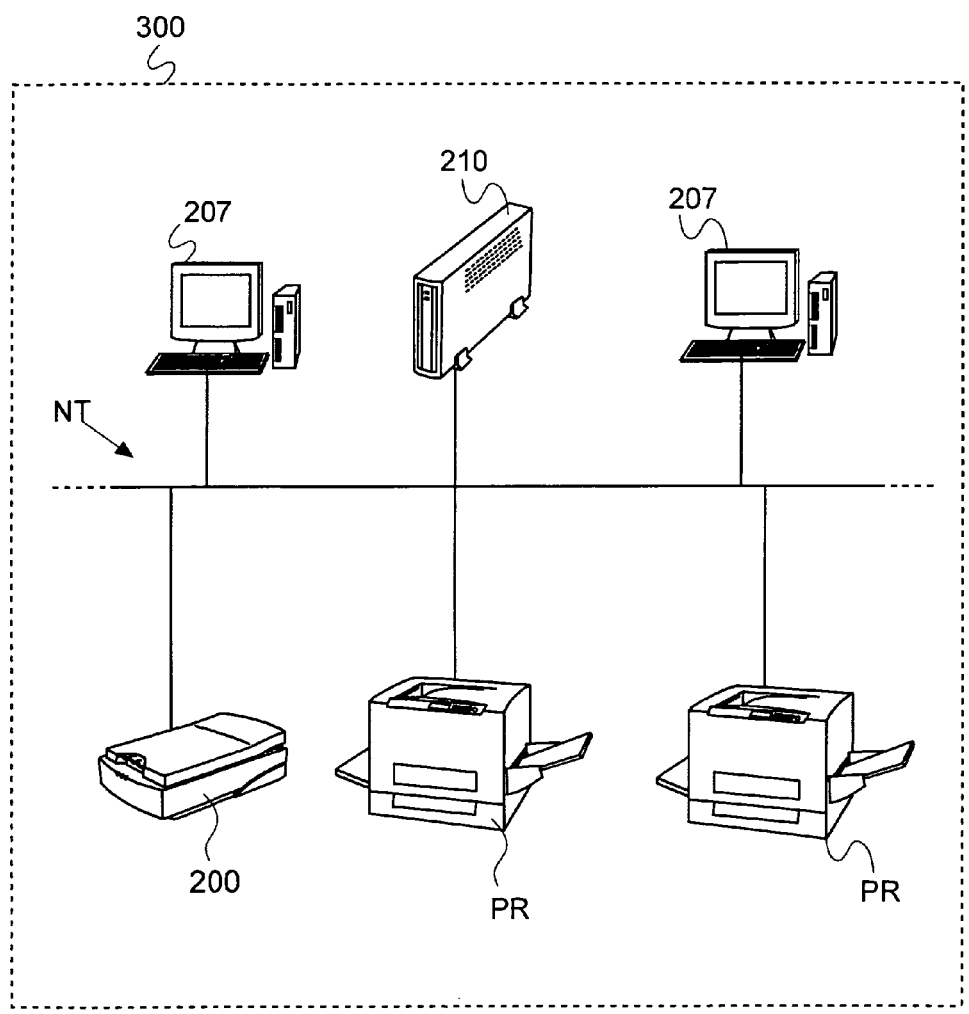
FIG. 9 is a connection diagram showing one example of connection of an image data saving system according to a fifth embodiment of the invention.

Next, the fifth embodiment of the invention will be described, with reference to FIG. 9.

In this embodiment, an image data saving system 300 is constructed by using the image reading device 200 and the like described in the fourth embodiment and utilizing a network NT. For example, as shown in FIG. 6, to the network NT, one image reading device 200 shown in the fourth embodiment can be connected. Moreover, to the network NT, two printers PR and two PCs as the external computers 207 can be connected. Further, to the network NT, a storage 210 can be connected so that image data of a read document and processing data can be saved in a shared manner and outputted by the printer PR. In other words, the composite machine 1 in the image forming system 100 shown in the second embodiment is replaced with the image reading device 200. In this manner, the image data saving system 300 is constructed. The number of devices connected is not limited to this.

Here, also in the image data saving system 300 of this embodiment, image data of a document read by the image reading device 200 is saved together with processing data without being subjected to image processing. Therefore, the reusability of the saved image data is high. Thus, printing with favorable image quality and high reproducibility can be performed even when printing-out is performed after image processing in the printer PR. In other words, image data with high reusability can be shared among the entire network NT.

Then, the image data read by the image reading device 200 and the processing data may be stored into the storage 210 or into a storage device such as the HDD included in any of the external computers 207 connected to the network NT. Since the various devices are connected to the network NT, the image data can be shared even when the image data and the processing data are saved in the storage 210 or the HDD of the PC.

Therefore, for example, reading by the image reading device 200 image data of a document, such as an internal document or a document model form, that needs to be shared, and storing this image data together with the processing data into the storage 210 permits printing to be performed with favorable image quality and high reproducibility even from the printer PR connected to the network NT. Even when the volume of image data accumulated in the HDD 206 has become small, this volume problem can be solved by saving the image data together with the processing data.

The embodiments of the invention have been described above, but the scope of the invention is not limited thereto, and thus various modification can be made within the range not departing from the spirits of the invention.

What is claimed is:

1. An image forming apparatus comprising:
   an image reading part reading a document to generate image data;
   an image processing part performing image processing on the image data;
   an image forming part printing out an image based on the image data already subjected to the image processing performed by the image processing part; and
   a storage part saving the image data not subjected to image processing, together with processing data for the image processing to be performed by the image processing part at subsequent image formation.

2. The image forming apparatus according to claim 1, wherein, to print out the image data stored in the storage part, the image processing part performs image processing by using the processing data, and the image forming part performs image formation based on the image data already subjected to the image processing.

3. The image forming apparatus according to claim 1, wherein the processing data is a magnification equalizing value as a value for correcting a size difference between a document and an output image arising from a characteristic of the image reading part when the image data is printed out in a size equal to a size of the document.

4. The image forming apparatus according to claim 2, wherein the processing data is a magnification equalizing value as a value for correcting a size difference between a document and an output image arising from a characteristic of the image reading part when the image data is printed out in a size equal to a size of the document.

5. The image forming apparatus according to claim 1, further comprising a density calculation part calculating a density value of the image data based on a density distribution of the partial or entire image data,
   wherein the processing data is the density value calculated by the density calculation part.

6. The image forming apparatus according to claim 2, further comprising a density calculation part calculating a density value of the image data based on a density distribution of the partial or entire image data,
   wherein the processing data is the density value calculated by the density calculation part.

7. The image forming apparatus according to claim 1, comprising an input part for operating the apparatus, wherein as a mode selected for reading the document by the image reading part, at least a character mode selected for reading as a character document or a photo mode selected for reading a document including a photo can be selected and inputted from the input part, and wherein the processing data is mode selection data indicating which of the modes has been selected to perform the document reading.

8. The image forming apparatus according to claim 2, comprising an input part for operating the apparatus, wherein as a mode selected for reading the document by the image reading part, at least a character mode selected for reading as a character document or a photo mode selected for reading a document including a photo can be selected and inputted from the input part, and wherein the processing data is mode selection data indicating which of the modes has been selected to perform the document reading.

9. An image forming system comprising:

at least one image forming apparatus comprising:
- an image reading part reading a document to generate image data,
- an image processing part performing image processing on the image data,
- an image forming part printing out an image based on the image data already subjected to the image processing performed by the image processing part, and
- a storage part saving the image data not subjected to image processing, together with processing data for the image processing to be performed by the image processing part later on;

a network connecting the image forming apparatus;

a storage device connected to the network and saving the image data of the read document and the processing data in a shared manner.

10. An image data saving method comprising the steps of:

reading a document to generate image data;

generating processing data for image processing to be performed on the image data at later image formation;

saving the image data into a storage part without subjecting the image data to image processing; and saving into the storage part the processing data in association with the corresponding image data.

11. The image data saving method according to claim 10, wherein, to print by an image forming part the image data stored in the storage part, image processing is performed by an image processing part on the image data to be printed, based on the processing data, and wherein the image forming part performs image formation based on the image data already subjected to the image processing.

12. A non-transitory computer readable medium storing an image data saving program causing an image forming apparatus or an image forming system having at least an image reading part, a storage part, an image forming part, and an image processing part to function in a following manner:

reading a document by the image reading part to generate image data;

generating processing data for image processing to be performed on the image data later on;

saving the image data into the storage part without subjecting the image data to image processing; and saving the processing data into the storage part in association with the corresponding image data.

13. A non-transitory computer readable medium storing the image data saving program according to claim 12, further causing the image processing part to perform image processing on the image data to be printed based on the processing data, and causing the image forming part to perform image formation based on the image data already subjected to the image processing.

14. An image reading device comprising:

an image reading part reading a document to generate image data; and a storage part saving the image data not subjected to image processing together with processing data for image processing to be performed for printing the image data at later image formation.

15. An image data saving system comprising:

at least one image reading device comprising:
- an image reading part reading a document to generate image data, and
- a storage part saving the image data not subjected to image processing together with processing data for image processing to be performed for printing the image data at later image formation;

a network connecting the image reading device; and a storage device connected to the network and sharing and saving the image data of the read document.

* * * * *